(12) United States Patent
Shin (10) Patent No.: US 10,331,264 B2
(45) Date of Patent: Jun. 25, 2019

(54) TOUCH DISPLAY APPARATUS AND METHOD OF MANUFACTURING THE SAME

(71) Applicant: Samsung Display Co., Ltd., Yongin-si (KR)

(72) Inventor: Youngmin Shin, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/391,510

(22) Filed: Dec. 27, 2016

(65) Prior Publication Data

US 2017/0185217 A1   Jun. 29, 2017

(30) Foreign Application Priority Data

Dec. 28, 2015 (KR) ........................ 10-2015-0187893

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01); *G06F 2203/04103* (2013.01)

(58) Field of Classification Search
CPC ...... G06F 3/0416; G06F 3/0412; G06F 3/044; G06F 3/041; G06F 2203/04103
See application file for complete search history.

(56) References Cited

U.S. PATENT DOCUMENTS

| | | | | |
|---|---|---|---|---|
| 2011/0148825 A1* | 6/2011 | Ueno | ...................... | G09G 3/006 345/204 |
| 2011/0193831 A1* | 8/2011 | Kunimori | ............ | G11C 19/184 345/204 |
| 2012/0098790 A1* | 4/2012 | Han | ........................ | G06F 3/044 345/174 |
| 2013/0127741 A1* | 5/2013 | Kao | ........................ | G06F 3/041 345/173 |
| 2014/0062916 A1* | 3/2014 | Hong | ...................... | G06F 3/041 345/173 |
| 2014/0247401 A1* | 9/2014 | Lee | .......................... | G06F 3/044 349/12 |
| 2014/0340595 A1* | 11/2014 | Kim | ........................ | G06F 3/044 349/12 |
| 2014/0368750 A1* | 12/2014 | Liao | ........................ | G06F 3/044 349/12 |
| 2016/0349895 A1* | 12/2016 | Long | ................... | G02F 1/13338 |
| 2017/0115786 A1* | 4/2017 | Kimura | ................... | G06F 3/044 |
| 2017/0185200 A1* | 6/2017 | Dai | ........................ | G06F 3/0412 |

* cited by examiner

*Primary Examiner* — Md Saiful A Siddiqui
(74) *Attorney, Agent, or Firm* — H.C. Park & Associates, PLC (57) ABSTRACT

A touch display apparatus including a base substrate, a sensing electrode, a first connection wiring, a second connection wiring, a first touch detector and a second touch detector. The sensing electrode is disposed on the base substrate. The first connection wiring is electrically connected to the sensing electrode. The second connection wiring is electrically connected to the sensing electrode. The first touch detector is electrically connected to the first connection wiring and configured to detect a touch event for the sensing electrode. The second touch detector is electrically connected to the second connection wiring and configured to detect the touch event.

8 Claims, 10 Drawing Sheets

TOUCH DISPLAY APPARATUS AND METHOD OF MANUFACTURING THE SAME

CROSS-REFERENCE TO RELATED APPLICATION

This application claims priority from and the benefit of Korean Patent Application No. 10-2015-0187893, filed on Dec. 28, 2015, which is hereby incorporated by reference for all purposes as if fully set forth herein.

BACKGROUND

Field

Exemplary embodiments relate to display apparatuses, and more particularly, to touch display apparatuses and methods of manufacturing the touch display apparatuses.

Discussion of the Background

As demands on various types of display devices have increased with the development of an information society, research has been conducted regarding display devices, such as liquid crystal display devices, plasma display panels, field emission display devices, electrophoretic display devices, organic light emitting display devices, and the like.

These studies have given rise to an ability to apply a touch function to such display devices via a touch screen panel. A touch screen panel is an input device that enables a command to be input by touching (or almost touching) a screen of a display device using an object, such as a finger, a pen, etc. In this manner, a touch screen panel can serve as a substitute for a separate input device connected to a display device, such as a keyboard, a mouse, and the like.

Touch screen panels may be resistive overlay touch screen panels, photosensitive touch screen panels, capacitive touch screen panels, and the like. Among the various types of touch screen panels, capacitive touch screen panels are configured to convert information regarding a position(s) of a touch interaction into an electrical signal by sensing a change in capacitance formed between a conductive sensing pattern and an adjacent sensing pattern, ground electrode, or the like, when an object, such as a user appendage, pen, etc., comes in contact with (or almost contacts, e.g., hovers above) the touch screen panel.

Touch electrodes included in a touch screen panel have a single-layered structure or a multi-layered structure (e.g., a double-layered structure). Touch electrodes having a single-layered structure includes sensing pads and signal wirings electrically connected to the sensing pads. If the signal wirings are arranged with a high degree of integration, defects (e.g., opened-line defects) may occur in the signal wirings.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a touch display apparatus having improved performance.

Exemplary embodiments provide a method of manufacturing the touch display apparatus.

Additional aspects will be set forth in the detailed description which follows, and, in part, will be apparent from the disclosure, or may be learned by practice of the inventive concept.

An exemplary embodiment discloses a touch display apparatus including a base substrate, a sensing electrode, a first connection wiring, a second connection wiring, a first touch detector and a second touch detector. The sensing electrode is disposed on the base substrate. The first connection wiring is electrically connected to the sensing electrode. The second connection wiring is electrically connected to the sensing electrode. The first touch detector is electrically connected to the first connection wiring and configured to detect a touch event for the sensing electrode. The second touch detector is electrically connected to the second connection wiring and configured to detect the touch event.

An exemplary embodiment also discloses a touch display apparatus including a base substrate, a plurality of sensing electrodes, a plurality of connection wirings, and a touch detector. The sensing electrodes are disposed on the base substrate and are arranged in a first direction. The connection wirings extend in the first direction. Each of the connection wirings is electrically connected to a respective one of the plurality of sensing electrodes. The touch detector is electrically connected to the connection wirings and configured to detect a touch event for the plurality of sensing electrodes. The sensing electrodes are divided into a plurality of electrode groups, each of which includes at least one of the sensing electrodes. Connection wirings connected to odd-numbered electrode groups are located at a first side of the sensing electrodes, and connection wirings connected to even-numbered electrode groups are located at a second side of the sensing electrodes.

An exemplary embodiment also discloses a method of manufacturing a touch display apparatus in which a sensing electrode, a first connection wiring and a second connection wiring are formed on a base substrate. The first connection wiring is electrically connected to the sensing electrode, and the second connection wiring is electrically connected to the sensing electrode. A first touch detector electrically connected to the first connection wiring and a second touch detector electrically connected to the second connection wiring are formed. The first and second touch detectors are configured to detect a touch event for the sensing electrode. An insulation layer is formed on the base substrate on which the sensing electrode, the first connection wiring and the second connection wiring are formed.

In a touch display apparatus according to exemplary embodiments, a first connection wiring, a second connection wiring, a first touch detector, and a second touch detector may be connected to a single sensing electrode. The second connection wiring and the second touch detector may be auxiliary elements and may operate only when at least one of the first connection wiring and the first touch detector has a defect. Accordingly, a malfunction of the touch display apparatus may be prevented, and the touch display apparatus may have relatively improved performance.

In addition, in a touch display apparatus according to exemplary embodiments, a plurality of sensing electrodes may be arranged in a matrix form, and sensing electrodes disposed in the same column may be alternately connected to first connection wirings at a first side with respect to the column and second connection wirings at a second side with respect to the column, by a unit of at least one sensing electrode. Accordingly, a plurality of connection wirings may be arranged with a relatively low degree of integration, defects on the plurality of connection wirings may be prevented, and thus, the touch display apparatus may have improved performance.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 1:
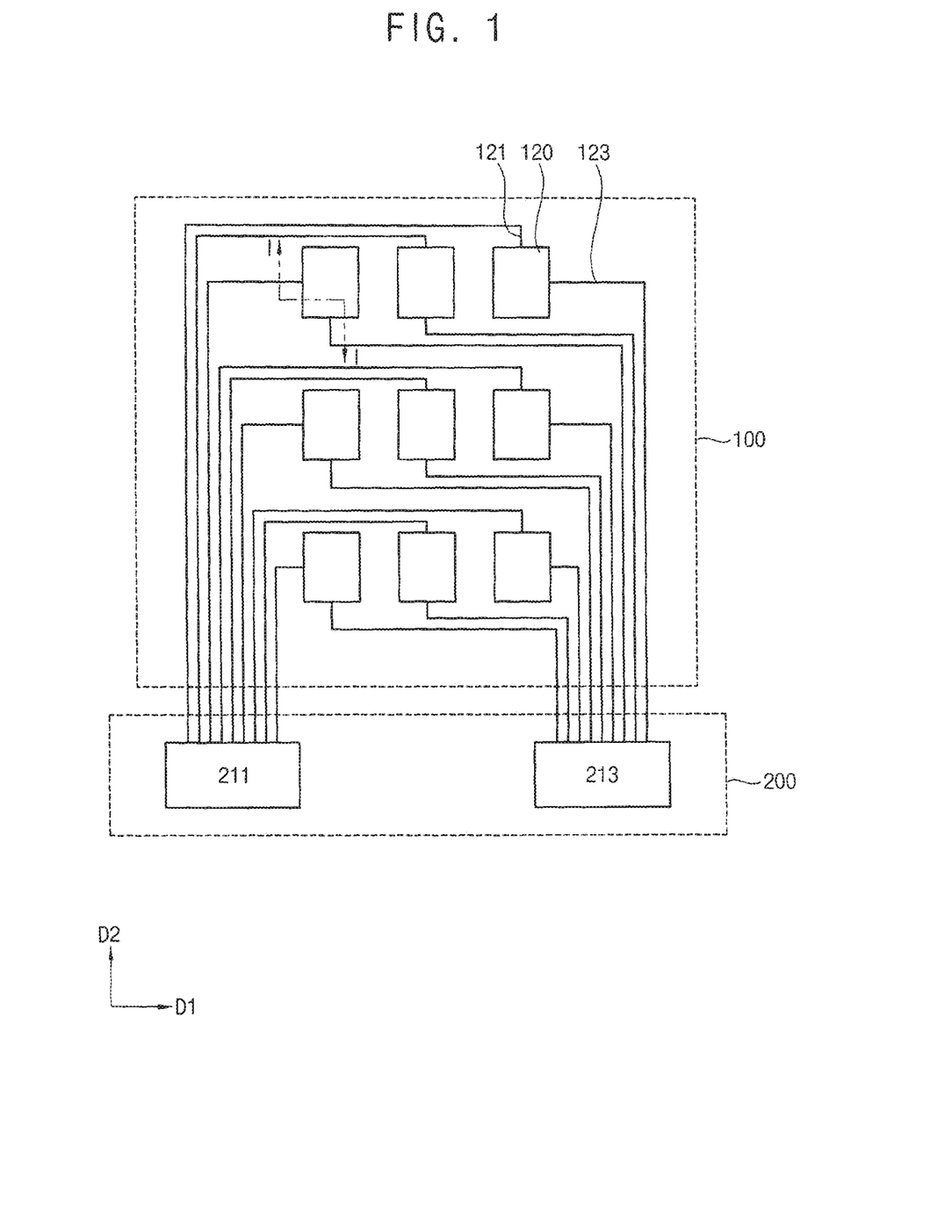
FIG. 1 is a plan view of a touch display apparatus according to an exemplary embodiment.
Figure 2:
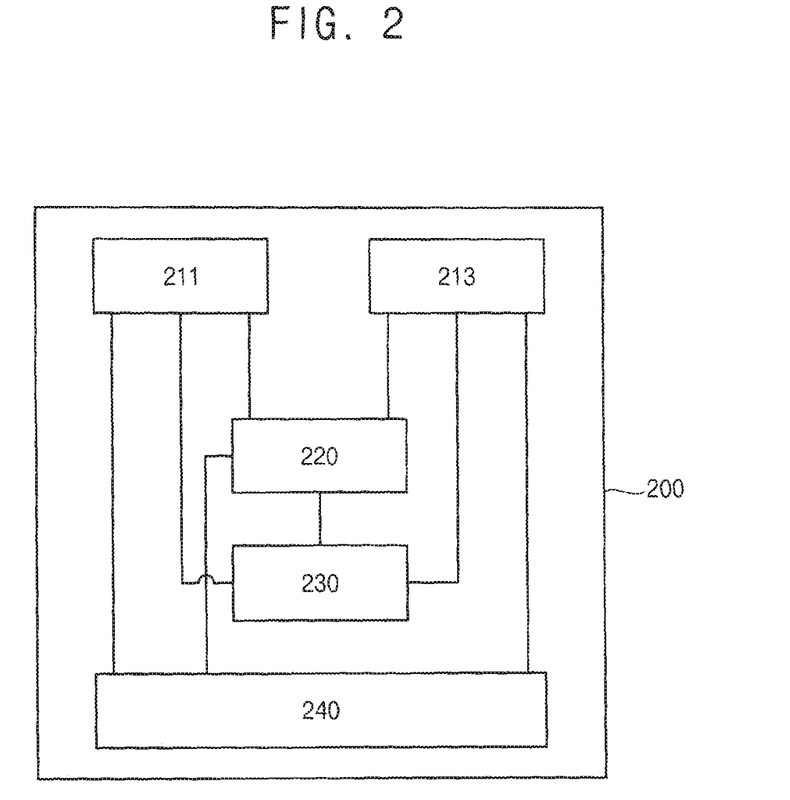
FIG. 2 is a block diagram illustrating a driving circuit included in a touch display apparatus according to an exemplary embodiment.
Figure 3:
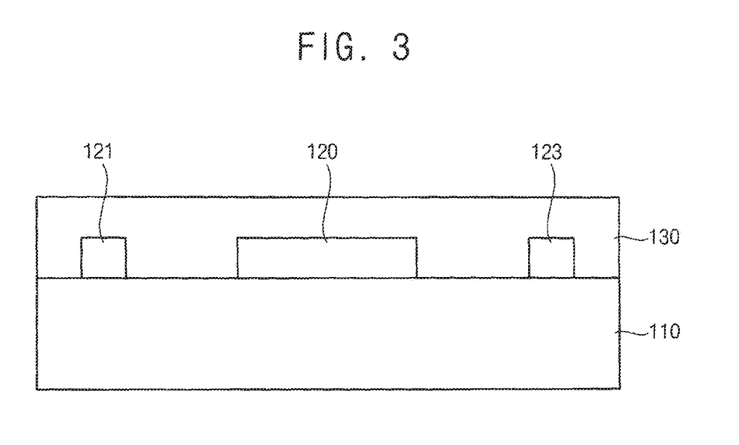
FIG. 3 is a cross-sectional view of the touch display apparatus taken along line I-I' of FIG. 1.

FIG. 1 is a plan view of a touch display apparatus according to exemplary embodiments. FIG. 2 is a block diagram illustrating a driving circuit included in a touch display apparatus according to exemplary embodiments. FIG. 3 is a cross-sectional view of the touch display apparatus taken along line I-I' of FIG. 1.

Referring to FIGS. 1, 2, and 3, a touch display apparatus according to an exemplary embodiment includes a touch sensing unit 100 and a driving circuit 200.

The touch sensing unit 100 includes a base substrate 110, a plurality of sensing electrodes 120, a plurality of first connection wirings 121, and a plurality of second connection wirings 123.

The base substrate 110 may include a transparent inorganic material or a flexible plastic. For example, the base substrate 110 may include a glass substrate, a quartz substrate, a transparent resin substrate including transparent resin, or the like.

In an exemplary embodiment, a polyimide substrate may be an example of the transparent resin substrate that is used as the base substrate 110. For example, the polyimide substrate may include a first polyimide layer, a barrier film layer, and a second polyimide layer that are sequentially stacked.

The sensing electrodes 120 may include a transparent conductive material. For example, the sensing electrodes 120 may include indium tin oxide (ITO), indium zinc oxide (IZO), or the like. In another example, the sensing electrodes 120 may include titanium (Ti), molybdenum titanium (MoTi), or the like.

The sensing electrodes 120 are disposed on the base substrate 110. The sensing electrodes 120 may be arranged in a matrix form, and may have a single-layered structure. In other words, the sensing electrodes 120 may be arranged in rows (e.g., in a first direction D1) and columns (e.g., in a second direction D2), and may be disposed on or formed in a single layer.

In an exemplary embodiment, each sensing electrode 120 may have a rectangular shape. However, the present disclosure is not limited thereto, and each sensing electrode 120 may have one of various shapes, e.g., polygonal, circular, etc.

The first connection wirings 121 are electrically connected to the sensing electrodes 120. Each of the first connection wirings 121 may be electrically connected to one side (e.g., a left side or a top side) of a respective one of the sensing electrodes 120. Some portions of each first connection wiring 121 may extend in the first direction D1, and the other portions of each first connection wiring 121 may extend in the second direction D2 crossing (e.g., substantially perpendicular to) the first direction D1. However, the present disclosure is not limited thereto, and each first connection wiring 121 may extend in any direction.

In an exemplary embodiment, the first connection wirings 121 may include the same material as that of the sensing electrodes 120. For example, the first connection wirings 121 may include a transparent conductive material, such as indium tin oxide (ITO), indium zinc oxide (IZO), or the like. In another example, the first connection wirings 121 may include titanium (Ti), molybdenum titanium (MoTi), or the like.

In an exemplary embodiment, the first connection wirings 121 may include a material different from that of the sensing electrodes 120. For example, the first connection wirings 121 may include a relatively low-resistance metallic material, such as molybdenum (Mo), silver (Ag), titanium (Ti), copper (Cu), aluminum (Al), molybdenum/aluminum/molybdenum (Mo/Al/Mo), or the like.

In an exemplary embodiment, the first connection wirings 121 may be disposed on the same layer as that on which the sensing electrodes 120 are disposed. However, the present disclosure is not limited thereto, and the first connection wirings 121 may be disposed on a layer different from that on which the sensing electrodes 120 are disposed.

The first connection wirings 121 are electrically connected to a first touch detector 211.

The second connection wirings 123 are electrically connected to the plurality of sensing electrodes 120. Each of the second connection wirings 123 may be electrically connected to another side (e.g., a right side or a bottom side), which is different from the one side connected to the first connection wiring 121, of a respective one of the sensing electrodes 120. Some portions of each second connection wiring 123 may extend in the first direction D1, and the other portions of each second connection wiring 123 may extend in the second direction D2. However, the present disclosure is not limited thereto, and each second connection wiring 123 may extend in any direction.

In an exemplary embodiment, the second connection wirings 123 may include the same material as that of the sensing electrodes 120. For example, the second connection wirings 123 may include a transparent conductive material, such as indium tin oxide (ITO), indium zinc oxide (IZO), or the like. In another example, the second connection wirings 123 may include titanium (Ti), molybdenum titanium (MoTi), or the like.

In an exemplary embodiment, the second connection wirings 123 may include a material different from that of the sensing electrodes 120. For example, the second connection wirings 123 may include a relatively low-resistance metallic material, such as molybdenum (Mo), silver (Ag), titanium (Ti), copper (Cu), aluminum (Al), molybdenum/aluminum/molybdenum (Mo/Al/Mo), or the like.

In an exemplary embodiment, the second connection wirings 123 may be disposed on the same layer as that on which the sensing electrodes 120 are disposed. However, the present disclosure is not limited thereto, and the second connection wirings 123 may be disposed on a layer different from that on which the sensing electrodes 120 are disposed.

The second connection wirings 123 may be electrically connected to a second touch detector 213.

In an exemplary embodiment shown in FIG. 1, two connection wirings are electrically connected to one sensing electrode 120. Such two connection wirings may include a single first connection wiring 121 and a single second connection wiring 123. Such a single first connection wiring 121 is electrically connected to the first touch detector 211, and such a single second connection wiring 123 is electrically connected to the second touch detector 213.

The second connection wiring 123 and the second touch detector 213 may operate only when there is a defect in at least one of the first connection wiring 121 and the first touch detector 211. For example, when a portion of the first connection wiring 121 is cut down or opened, and/or when the first touch detector 211 has a breakdown or a malfunction, the second connection wiring 123 and the second touch detector 213 may operate. When both the first connection wiring 121 and the first touch detector 211 are free of defects, the second connection wiring 123 and the second touch detector 213 may not operate. Since the second connection wiring 123 and the second touch detector 213 operate as an auxiliary wiring and an auxiliary detector, a malfunction of the touch display apparatus according to exemplary embodiments may be prevented, and the touch display apparatus according to exemplary embodiments may have relatively improved performance and low power consumption.

An insulation layer 130 may be disposed on the base substrate 110 on which the sensing electrode 120, the first connection wiring 121, and the second connection wiring 123 are disposed.

The insulation layer 130 may cover the sensing electrode 120, the first connection wiring 121, and the second connection wiring 123. In other words, the sensing electrode 120, the first connection wiring 121, and the second connection wiring 123 may not be exposed and may be insulated by the insulation layer 130. The insulation layer 130 may prevent the sensing electrode 120, the first connection wiring 121, and the second connection wiring 123 from damaging or corroding.

In an exemplary embodiment, the insulation layer 130 may include an inorganic insulating material. For example, the insulation layer 130 may include silicon oxide ($SiO_x$), silicon nitride ($SiN_x$), or the like. For example, the insulation layer 130 may include silicon oxide ($SiO_x$) and may have a thickness of about 500 Å. In addition, the insulation layer 130 may include a plurality of layers, each of which includes a material different from that of the other layers.

The driving circuit 200 may include the first touch detector 211, the second touch detector 213, a touch information generator 220, a memory 230, and a controller 240.

The first touch detector 211 and the second touch detector 213 may detect a touch event for the sensing electrode 120 (e.g., detect whether the touch sensing unit 100 is contacted by a contact object, such as a user's finger, stylus pen, etc.) based on a change in capacitance caused by the touch event. The second touch detector 213 may operate as an auxiliary detector. In other words, the second touch detector 213 may operate only when the first touch detector 211 has a defect.

The touch information generator 220 may generate information associated with the touch event for the sensing electrode 120. The touch information generator 220 may process, handle or treat information stored in the memory 230 to generate desired information including a touch detection, a touch region, a touch location, etc.

The memory 230 may store the information provided from the touch information generator 220. The memory 230 may store information provided from the first touch detector 211 and the second touch detector 213. In addition, the memory 230 may store predetermined data for calculating the touch detection, the touch region, the touch location, etc., or data received in real-time.

The controller 240 may control the first touch detector 211, the second touch detector 213, and the touch information generator 220. For example, the controller 240 may include a micro control unit (MCU) and may perform predetermined signal processing based on firmware.

Figure 4:
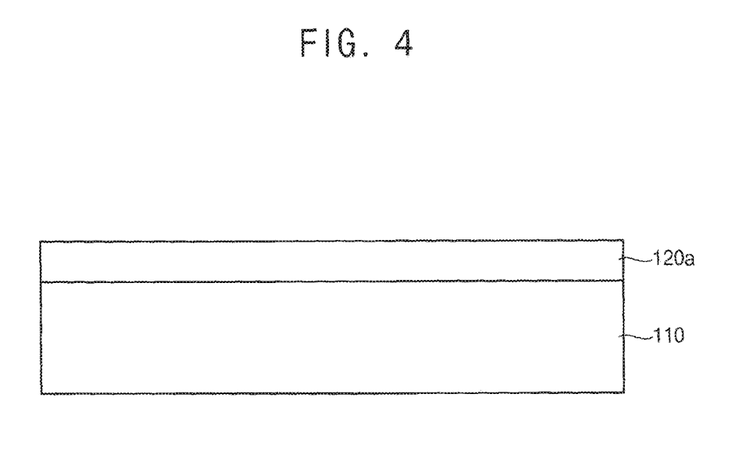
FIG. 4 and FIG. 5 are cross-sectional views for describing a method of manufacturing a touch display apparatus according to an exemplary embodiment.
Figure 5:
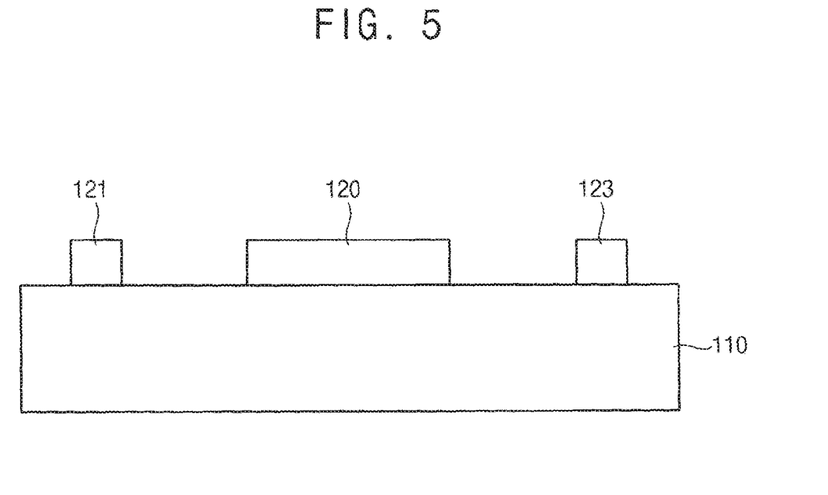

FIGS. 4 and 5 are cross-sectional views for describing a method of manufacturing a touch display apparatus according to an exemplary embodiment.

Referring to FIG. 4, a sensing electrode layer 120*a* is formed on a base substrate 110.

In an exemplary embodiment, the sensing electrode layer 120*a* may include a transparent conductive material. For example, the sensing electrode layer 120*a* may include indium tin oxide (ITO), indium zinc oxide (IZO), or the like. In another example, the sensing electrode layer 120*a* may include titanium (Ti), molybdenum titanium (MoTi), or the like.

Referring to FIG. 5, a sensing electrode 120, a first connection wiring 121, and a second connection wiring 123 are formed by patterning the sensing electrode layer 120*a*.

The sensing electrode 120 may include a transparent conductive material. For example, the sensing electrode 120 may include indium tin oxide (ITO), indium zinc oxide (IZO), or the like. In another example, the sensing electrode 120 may include titanium (Ti), molybdenum titanium (MoTi), or the like.

In an exemplary embodiment, the first connection wiring 121 may include the same material as that of the sensing electrode 120. For example, the first connection wiring 121 may include a transparent conductive material, such as indium tin oxide (ITO), indium zinc oxide (IZO), or the like.

In another example, the first connection wiring 121 may include titanium (Ti), molybdenum titanium (MoTi), or the like.

In an exemplary embodiment, the first connection wiring 121 may be disposed on the same layer as that on which the sensing electrode 120 is disposed.

In an exemplary embodiment, the second connection wiring 123 may include the same material as that of the sensing electrode 120. For example, the second connection wiring 123 may include a transparent conductive material, such as indium tin oxide (ITO), indium zinc oxide (IZO), or the like. In another example, the second connection wiring 123 may include titanium (Ti), molybdenum titanium (MoTi), or the like.

In an exemplary embodiment, the second connection wiring 123 may be disposed on the same layer as that on which the sensing electrode 120 is disposed.

Referring to FIG. 1, a first touch detector 211 and a second touch detector 213 may be formed. The first touch detector 211 may be electrically connected to the first connection wiring 121. The second touch detector 213 may be electrically connected to the second connection wiring 123. The first touch detector 211 and the second touch detector 213 may detect a touch event for the sensing electrode 120.

Referring to FIG. 3, an insulation layer 130 is formed on the base substrate 110 on which the sensing electrode 120, the first connection wiring 121, and the second connection wiring 123 are formed.

The insulation layer 130 may cover the sensing electrode 120, the first connection wiring 121, and the second connection wiring 123. In other words, the sensing electrode 120, the first connection wiring 121 and the second connection wiring 123 may not be exposed and may be insulated by the insulation layer 130. The insulation layer 130 may prevent the sensing electrode 120, the first connection wiring 121, and the second connection wiring 123 from corroding or otherwise being damaged.

In an exemplary embodiment, the insulation layer 130 may include an inorganic insulating material. For example, the insulation layer 130 may include silicon oxide ($SiO_x$), silicon nitride ($SiN_x$), or the like. For example, the insulation layer 130 may include silicon oxide ($SiO_x$) and may have a thickness of about 500 Å. In addition, the insulation layer 130 may include a plurality of layers, each of which includes a material different from that of the other layers.

Figure 6:
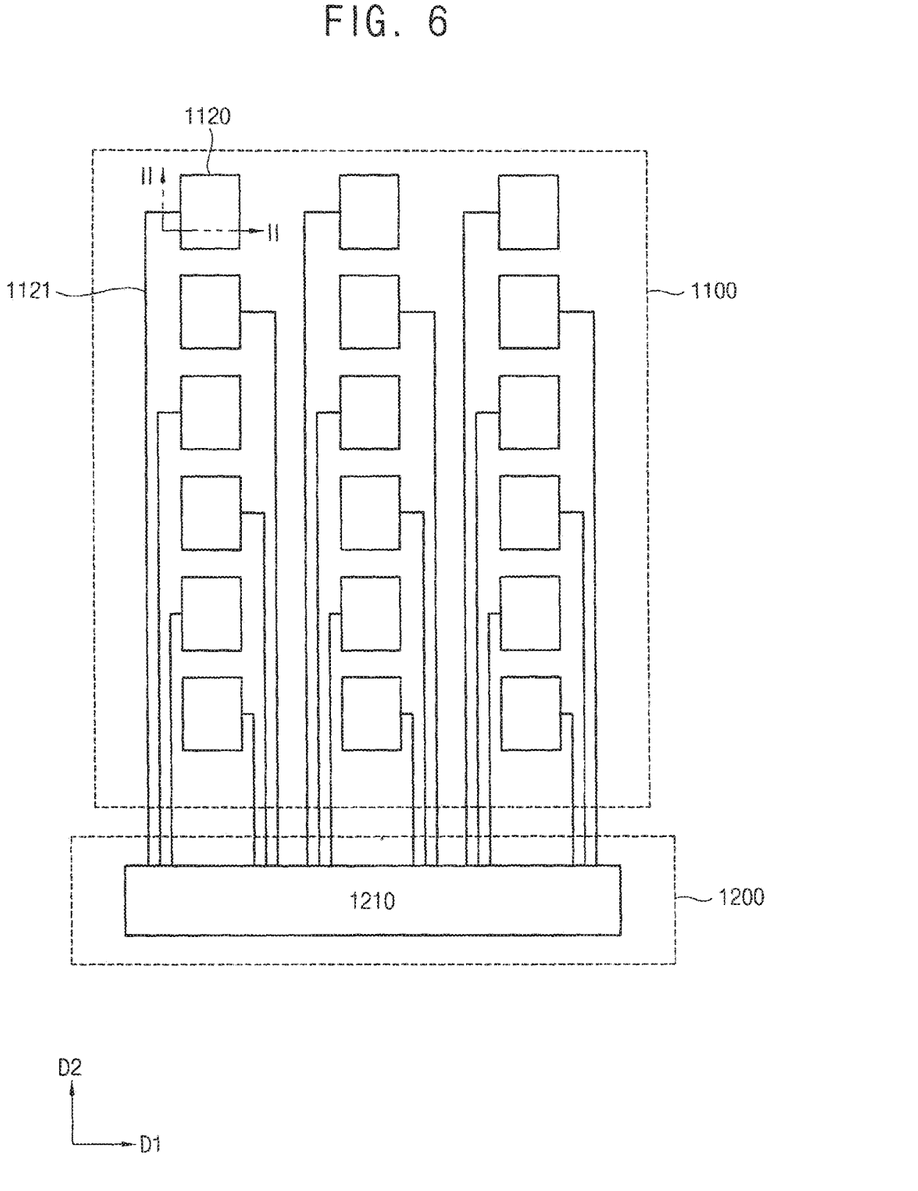
FIG. 6 is a plan view of a touch display apparatus according to an exemplary embodiment.
Figure 7:
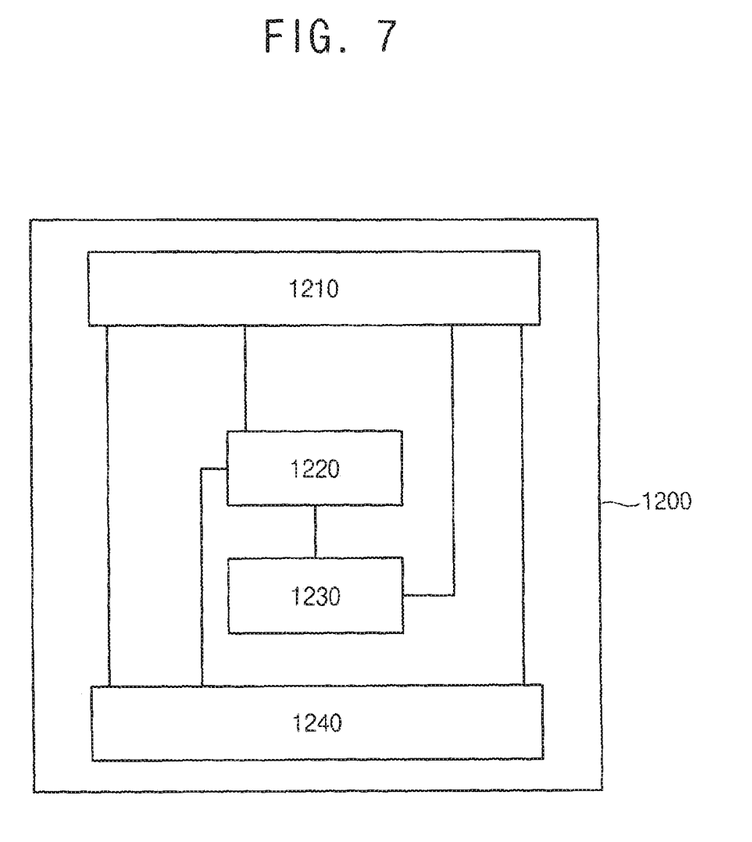
FIG. 7 is a block diagram illustrating a driving circuit included in a touch display apparatus according to an exemplary embodiment.
Figure 10:
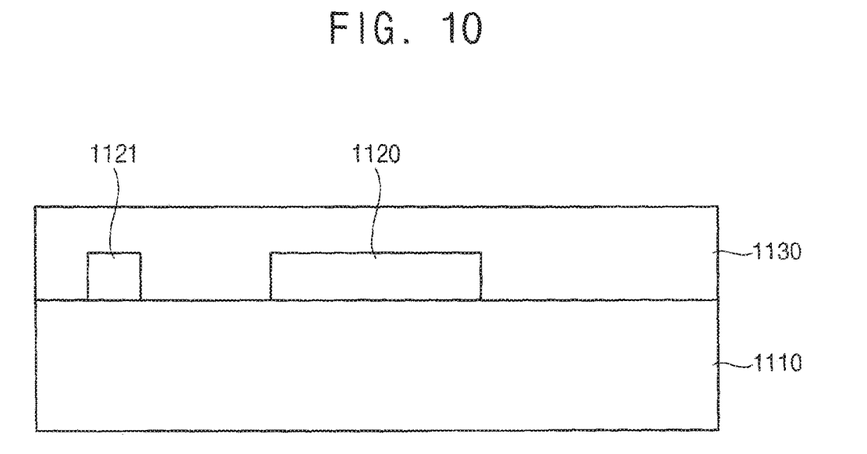
FIG. 10 is a cross-sectional view of the touch display apparatus taken along line II-II' of FIG. 6.

FIG. 6 is a plan view of a touch display apparatus according to an exemplary embodiment. FIG. 7 is a block diagram illustrating a driving circuit included in a touch display apparatus according to an exemplary embodiment. FIG. 10 is a cross-sectional view of the touch display apparatus taken along line II-II' of FIG. 6.

Referring to FIGS. 6, 7, and 10, a touch display apparatus according to an exemplary embodiment includes a touch sensing unit 1100 and a driving circuit 1200.

The touch sensing unit 1100 includes a base substrate 1110, a plurality of sensing electrodes 1120, and a plurality of connection wirings 1121.

The base substrate 1110 may include a transparent inorganic material or a flexible plastic. For example, the base substrate 1110 may include a glass substrate, a quartz substrate, a transparent resin substrate including transparent resin, or the like.

In an exemplary embodiment, a polyimide substrate may be an example of the transparent resin substrate that is used as the base substrate 1110. For example, the polyimide substrate may include a first polyimide layer, a barrier film layer, and a second polyimide layer that are sequentially stacked.

The sensing electrodes 1120 may include a transparent conductive material. For example, the plurality of sensing electrodes 1120 may include indium tin oxide (ITO), indium zinc oxide (IZO), or the like. In another example, the plurality of sensing electrodes 1120 may include titanium (Ti), molybdenum titanium (MoTi), or the like.

The sensing electrodes 1120 may be disposed on the base substrate 1110. The sensing electrodes 1120 may be arranged in a matrix form, and may have a single-layered structure. In other words, the sensing electrodes 1120 may be arranged in rows (e.g., in a first direction D1) and columns (e.g., in a second direction D2), and may be disposed or formed in a single layer.

In an exemplary embodiment, each sensing electrode 1120 may have a rectangular shape. However, the present disclosure is not limited thereto, and each sensing electrode 1120 may have one of various shapes, e.g., polygonal, circular, etc.

The connection wirings 1121 may be electrically connected to the sensing electrodes 1120. Each of the connection wirings 1121 may be electrically connected to one side (e.g., a left side or a right side) of a respective one of the sensing electrodes 1120. Some portions of each connection wiring 1121 may extend in the first direction D1, and the other portions of each connection wiring 1121 may extend in the second direction D2 crossing (e.g., substantially perpendicular to) the first direction D1. In an exemplary embodiment shown in FIG. 6, a portion of each connection wiring 1121 may extend in the second direction D2 that is substantially parallel with the columns of the sensing electrodes 1120. However, the present disclosure is not limited thereto, and each connection wiring 1121 may extend in any direction.

Sensing electrodes disposed in the same column may be divided into a plurality of electrode groups, and each of the electrode groups may include at least one sensing electrode 1120. For example, in an exemplary embodiment shown in FIG. 6, each electrode group may include one sensing electrode. However, the present disclosure is not limited thereto, and each electrode group may include any number of sensing electrodes.

In an exemplary embodiment, connection wirings connected to odd-numbered electrode groups may be located at or adjacent to a first side (e.g., a left side) of the sensing electrodes, and connection wirings connected to even-numbered electrode groups may be located at or adjacent to a second side (e.g., a right side) of the sensing electrodes. As illustrated in FIG. 6, connection wirings connected to first, third and fifth electrode groups that are arranged at first, third and fifth rows may be located at a left side of the sensing electrodes 1120, and connection wirings connected to second, fourth and sixth electrode groups that are arranged at second, fourth and sixth rows may be located at a right side of the sensing electrodes 1120.

In an exemplary embodiment shown in FIG. 6, sensing electrodes disposed in the same column may be alternately connected to first connection wirings at a left side with respect to the column and second connection wirings at a right side with respect to the column, by a unit of a single sensing electrode. Accordingly, the connection wirings 1121 may be arranged with a relatively low degree of integration, defects in the connection wirings 1121 may be prevented, and thus, the touch display apparatus according to exemplary embodiments may have relatively improved performance.

In an exemplary embodiment, the connection wirings 1121 may include the same material as that of the sensing electrodes 1120. For example, the connection wirings 1121 may include a transparent conductive material, such as indium tin oxide (ITO), indium zinc oxide (IZO), or the like. In another example, the connection wirings 1121 may include titanium (Ti), molybdenum titanium (MoTi), or the like.

In an exemplary embodiment, the connection wirings 1121 may include a material different from that of the sensing electrodes 1120. For example, the connection wirings 1121 may include a relatively low-resistance metallic material, such as molybdenum (Mo), silver (Ag), titanium (Ti), copper (Cu), aluminum (Al), molybdenum/aluminum/molybdenum (Mo/Al/Mo), or the like.

In an exemplary embodiment, the connection wirings 1121 may be disposed on the same layer as that on which the sensing electrodes 1120 are disposed. However, the present disclosure is not limited thereto, and the connection wirings 1121 may be disposed on a layer different from that on which the sensing electrodes 1120 are disposed.

The plurality of connection wirings 1121 may be electrically connected to a touch detector 1210.

An insulation layer 1130 may be disposed on the base substrate 1110 on which the sensing electrodes 1120 and the connection wirings 1121 are disposed.

The insulation layer 1130 may cover the sensing electrodes 1120 and the connection wirings 1121. In other words, the sensing electrodes 1120 and the connection wirings 1121 may not be exposed, and may be insulated by the insulation layer 1130. The insulation layer 1130 may prevent the sensing electrodes 1120 and the connection wirings 1121 from being damaged or corroded.

In an exemplary embodiment, the insulation layer 1130 may include an inorganic insulating material. For example, the insulation layer 1130 may include silicon oxide ($SiO_x$), silicon nitride ($SiN_x$), or the like. For example, the insulation layer 1130 may include silicon oxide ($SiO_x$) and may have a thickness of about 500 Å. In addition, the insulation layer 1130 may include a plurality of layers, each of which includes a material different from that of the other layers.

The driving circuit 1200 may include the touch detector 1210, a touch information generator 1220, a memory 1230, and a controller 1240.

The touch detector 1210 detects a touch event for the sensing electrodes 1120 (e.g., detect whether the touch sensing unit 1100 is contacted by a contact object, such as a user's finger, stylus pen, etc.) based on a change in capacitance caused by the touch event.

The touch information generator 1220 may generate information associated with the touch event for the sensing electrodes 1120. The touch information generator 1220 may process, handle, or treat information stored in the memory 1230 to generate desired information including a touch detection, a touch region, a touch location, etc.

The memory 1230 may store the information provided from the touch information generator 1220. The memory 1230 may store information provided from the touch detector 1210. In addition, the memory 1230 may store predetermined data for calculating the touch detection, the touch region, the touch location, etc., or data received in real-time.

The controller 1240 may control the touch detector 1210 and the touch information generator 1220. For example, the controller 1240 may include a micro control unit (MCU) and may perform a predetermined signal processing based on a firmware.

Figure 8:
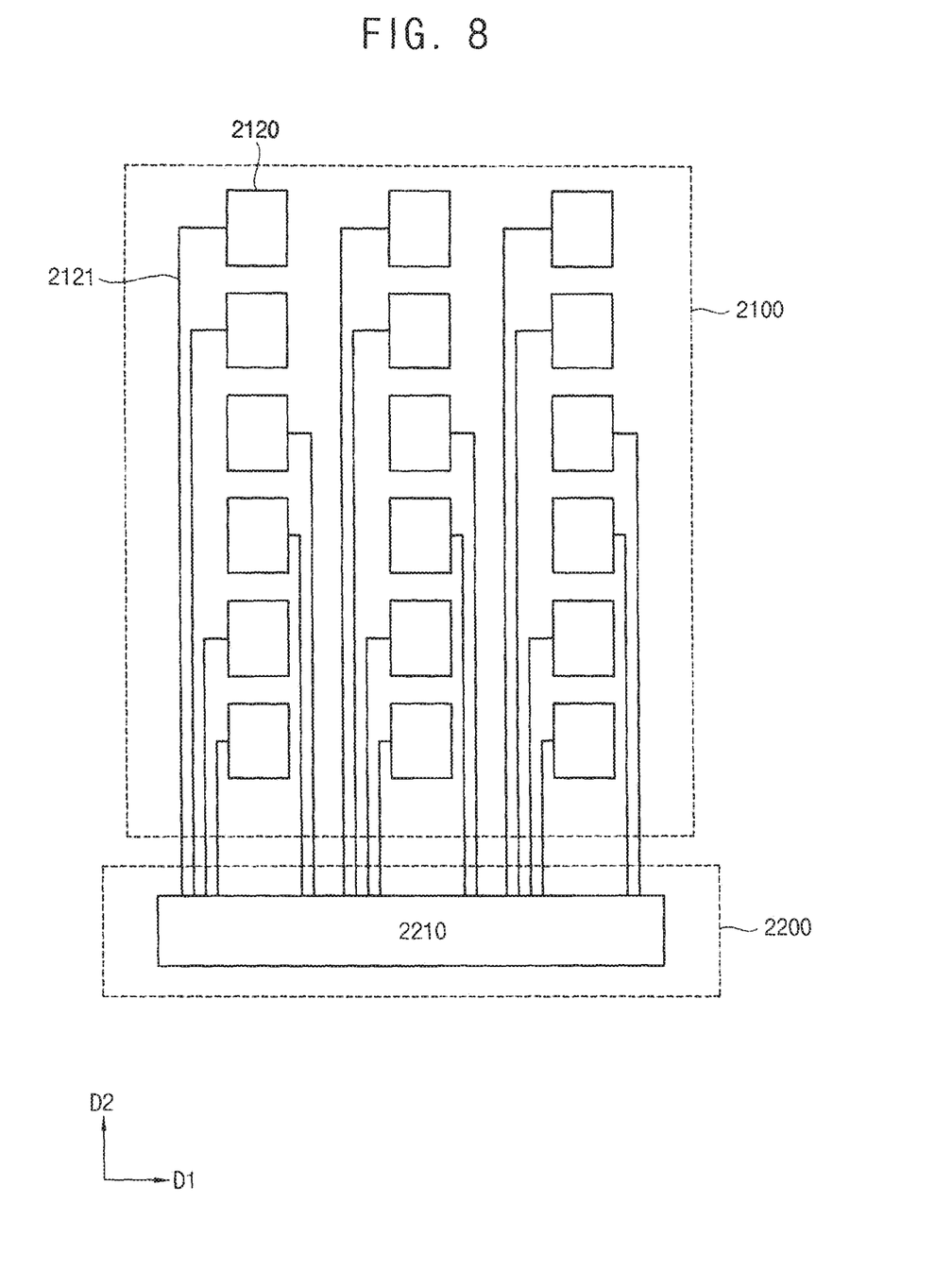
FIG. 8 is a plan view of a touch display apparatus according to an exemplary embodiment.

FIG. 8 is a plan view of a touch display apparatus according to an exemplary embodiment.

Referring to FIG. 8, a touch display apparatus according to an exemplary embodiment includes a touch sensing unit 2100 and a driving circuit 2200.

The touch sensing unit 2100 may include a base substrate, a plurality of sensing electrodes 2120 and a plurality of connection wirings 2121.

The base substrate may include a transparent inorganic material or a flexible plastic. For example, the base substrate may include a glass substrate, a quartz substrate, a transparent resin substrate including transparent resin, or the like.

In an exemplary embodiment, an example of a transparent resin substrate that may be used as the base substrate is a polyimide substrate. For example, the polyimide substrate may include a first polyimide layer, a barrier film layer, and a second polyimide layer that are sequentially stacked.

The sensing electrodes 2120 may include a transparent conductive material. For example, the sensing electrodes 2120 may include indium tin oxide (ITO), indium zinc oxide (IZO), or the like. In another example, the sensing electrodes 2120 may include titanium (Ti), molybdenum titanium (MoTi), or the like.

The sensing electrodes 2120 may be disposed on the base substrate. The sensing electrodes 2120 may be arranged in a matrix form, and may have a single-layered structure. In other words, the sensing electrodes 2120 may be arranged in rows (e.g., in a first direction D1) and columns (e.g., in a second direction D2), and may be disposed or formed in a single layer.

In an exemplary embodiment, each sensing electrode 2120 may have a rectangular shape. However, the present disclosure is not limited thereto, and each sensing electrode 2120 may have one of various shapes, e.g., polygonal, circular, etc.

The connection wirings 2121 may be electrically connected to the sensing electrodes 2120. Each of the connection wirings 2121 may be electrically connected to one side (e.g., a left side or a right side) of a respective one of the sensing electrodes 2120. Some portions of each connection wiring 2121 may extend in the first direction D1, and the other portions of each connection wiring 2121 may extend in the second direction D2 crossing (e.g., substantially perpendicular to) the first direction D1. In an exemplary embodiment shown in FIG. 8, a portion of each connection wiring 2121 may extend in the second direction D2 that is substantially in parallel with the columns of the sensing electrodes 2120. However, the present disclosure is not limited thereto, and each connection wiring 2121 may extend in any direction.

Sensing electrodes disposed in the same column may be divided into a plurality of electrode groups, and each of the electrode groups may include at least one sensing electrode 2120. For example, in an exemplary embodiment shown in FIG. 8, each electrode group may include two sensing electrodes. However, the present disclosure is not limited thereto, and each electrode group may include any number of sensing electrodes.

In an exemplary embodiment, connection wirings connected to odd-numbered electrode groups may be located at or adjacent to a first side (e.g., a left side) of the sensing electrodes, and connection wirings connected to even-numbered electrode groups may be located at or adjacent to a second side (e.g., a right side) of the sensing electrodes. As illustrated in FIG. 8, connection wirings connected to first and third electrode groups that are arranged at first, second, fifth, and sixth rows may be located at a left side of the sensing electrodes 2120, and connection wirings connected to a second electrode group that are arranged at third and fourth rows may be located at a right side of the sensing electrodes 2120.

In an exemplary embodiment shown in FIG. 8, sensing electrodes disposed in the same column may be alternately connected to first connection wirings at a left side with respect to the column and second connection wirings at a right side with respect to the column, by a unit of two sensing electrodes. Accordingly, the connection wirings 2121 may be arranged with a relatively low degree of integration, defects on the plurality of connection wirings 2121 may be prevented, and thus, the touch display apparatus according to exemplary embodiments may have relatively improved performance.

In an exemplary embodiment, the connection wirings 2121 may include the same material as that of the sensing electrodes 2120. For example, the connection wirings 2121 may include a transparent conductive material, such as indium tin oxide (ITO), indium zinc oxide (IZO), or the like. In another example, the connection wirings 2121 may include titanium (Ti), molybdenum titanium (MoTi), or the like.

In an exemplary embodiment, the connection wirings 2121 may include a material different from that of the sensing electrodes 2120. For example, the connection wirings 2121 may include a relatively low-resistance metallic material, such as molybdenum (Mo), silver (Ag), titanium (Ti), copper (Cu), aluminum (Al), molybdenum/aluminum/molybdenum (Mo/Al/Mo), or the like.

In an exemplary embodiment, the connection wirings 2121 may be disposed on the same layer as that on which the sensing electrodes 2120 are disposed. However, the present disclosure is not limited thereto, and the connection wirings 2121 may be disposed on a layer different from that on which the sensing electrodes 2120 are disposed.

The connection wirings 2121 may be electrically connected to a touch detector 2210 included in the driving circuit 2200.

Figure 9:
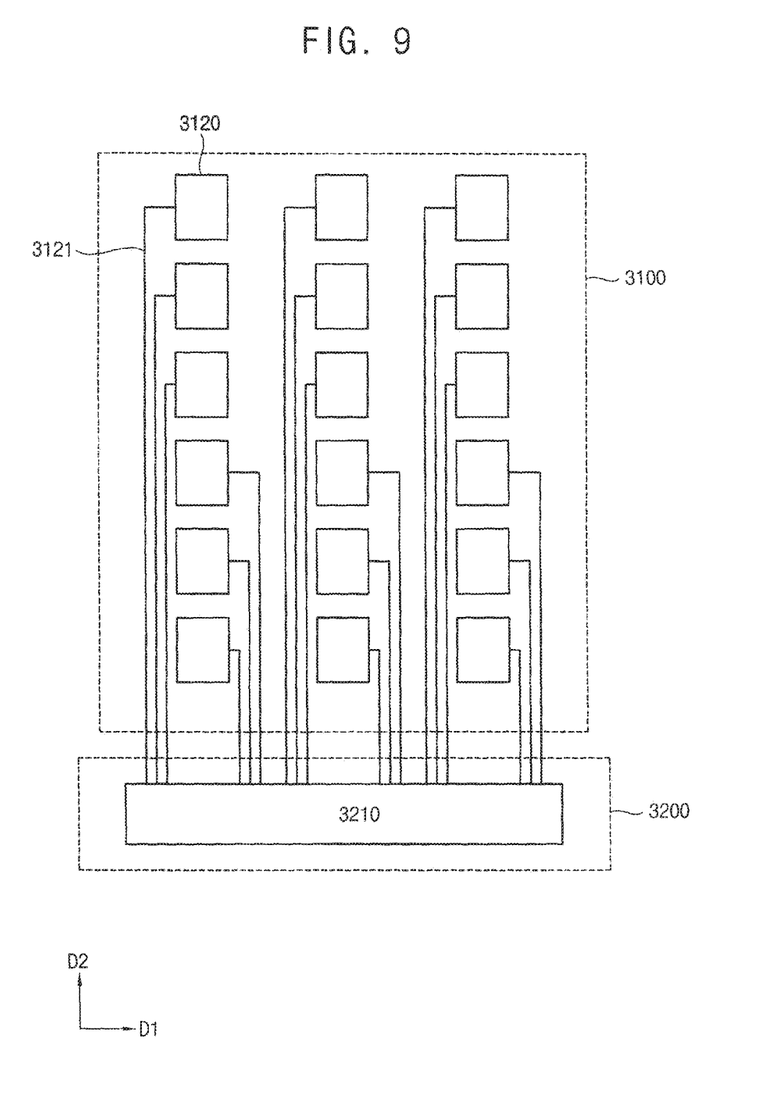
FIG. 9 is a plan view of a touch display apparatus according to an exemplary embodiment.

FIG. 9 is a plan view of a touch display apparatus according to an exemplary embodiment.

Referring to FIG. 9, a touch display apparatus according to an exemplary embodiment includes a touch sensing unit 3100 and a driving circuit 3200.

The touch sensing unit 3100 may include a base substrate, a plurality of sensing electrodes 3120, and a plurality of connection wirings 3121.

The base substrate may include a transparent inorganic material or a flexible plastic. For example, the base substrate may include a glass substrate, a quartz substrate, a transparent resin substrate including transparent resin, or the like.

In an exemplary embodiment, an example of the transparent resin substrate that is used as the base substrate may be a polyimide substrate. For example, the polyimide substrate may include a first polyimide layer, a barrier film layer and a second polyimide layer that are sequentially stacked.

The sensing electrodes 3120 may include a transparent conductive material. For example, the sensing electrodes 3120 may include indium tin oxide (ITO), indium zinc oxide (IZO), or the like. In another example, the sensing electrodes 3120 may include titanium (Ti), molybdenum titanium (MoTi), or the like.

The sensing electrodes 3120 may be disposed on the base substrate. The sensing electrodes 3120 may be arranged in a matrix form, and may have a single-layered structure. In other words, the sensing electrodes 3120 may be arranged in rows (e.g., in a first direction D1) and columns (e.g., in a second direction D2), and may be disposed or formed in a single layer.

In an exemplary embodiment, each sensing electrode 3120 may have a rectangular shape. However, the present disclosure is not limited thereto, and each sensing electrode 3120 may have one of various shapes, e.g., polygonal, circular, etc.

The connection wirings 3121 are electrically connected to the sensing electrodes 3120. Each of the connection wirings 3121 may be electrically connected to one side (e.g., a left side or a right side) of a respective one of the sensing electrodes 3120. Some portions of each connection wiring 3121 may extend in the first direction D1, and the other portions of each connection wiring 3121 may extend in the second direction D2 crossing (e.g., substantially perpendicular to) the first direction D1. In an exemplary embodiment shown in FIG. 9, a portion of each connection wiring 3121 may extend in the second direction D2 that is substantially parallel with the columns of the sensing electrodes 3120. However, the present disclosure is not limited thereto, and each connection wiring 3121 may extend in any direction.

Sensing electrodes disposed in the same column may be divided into a plurality of electrode groups, and each of the electrode groups may include at least one sensing electrode 3120. For example, in an exemplary embodiment shown in FIG. 9, each electrode group may include three sensing electrodes. However, the present disclosure is not limited thereto, and each electrode group may include any number of sensing electrodes.

In an exemplary embodiment, connection wirings connected to odd-numbered electrode groups may be located at or adjacent to a first side (e.g., a left side) of the sensing electrodes, and connection wirings connected to even-numbered electrode groups may be located at or adjacent to a second side (e.g., a right side) of the sensing electrodes. As illustrated in FIG. 9, connection wirings connected to a first electrode group that are arranged at first, second, and third rows may be located at a left side of the sensing electrodes 3120, and connection wirings connected to a second electrode group that are arranged at fourth, fifth, and sixth rows may be located at a right side of the plurality of sensing electrodes 3120.

In an exemplary embodiment shown in FIG. 9, sensing electrodes disposed in the same column may be alternately connected to first connection wirings at a left side with respect to the column and second connection wirings at a right side with respect to the column, by a unit of three sensing electrodes. Accordingly, the connection wirings 3121 may be arranged with a relatively low degree of integration, defects in the connection wirings 3121 may be prevented, and thus, the touch display apparatus according to exemplary embodiments may have relatively improved performance.

In an exemplary embodiment, the connection wirings 3121 may include the same material as that of the sensing electrodes 3120. For example, the connection wirings 3121 may include a transparent conductive material, such as indium tin oxide (ITO), indium zinc oxide (IZO), or the like. In another example, the connection wirings 3121 may include titanium (Ti), molybdenum titanium (MoTi), or the like.

In an exemplary embodiment, the connection wirings 3121 may include a material different from that of the sensing electrodes 3120. For example, the connection wirings 3121 may include a relatively low-resistance metallic material, such as molybdenum (Mo), silver (Ag), titanium (Ti), copper (Cu), aluminum (Al), molybdenum/aluminum/molybdenum (Mo/Al/Mo), or the like.

In an exemplary embodiment, the connection wirings 3121 may be disposed on the same layer as that on which the sensing electrodes 3120 are disposed. However, the present disclosure is not limited thereto, and the connection wirings 3121 may be disposed on a layer different from that on which the sensing electrodes 3120 are disposed.

The connection wirings 3121 are electrically connected to a touch detector 3210 included in the driving circuit 3200.

Figure 11:
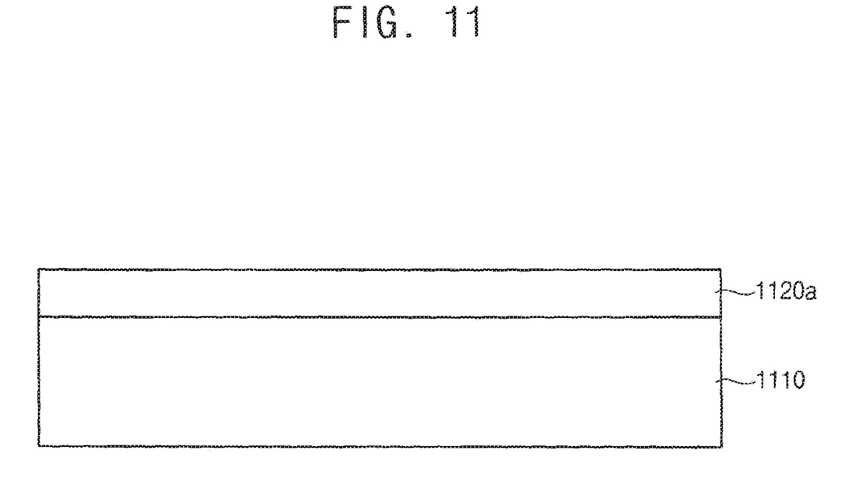
FIG. 11 and FIG. 12 are cross-sectional views for describing a method of manufacturing a touch display apparatus according to an exemplary embodiment.
Figure 12:
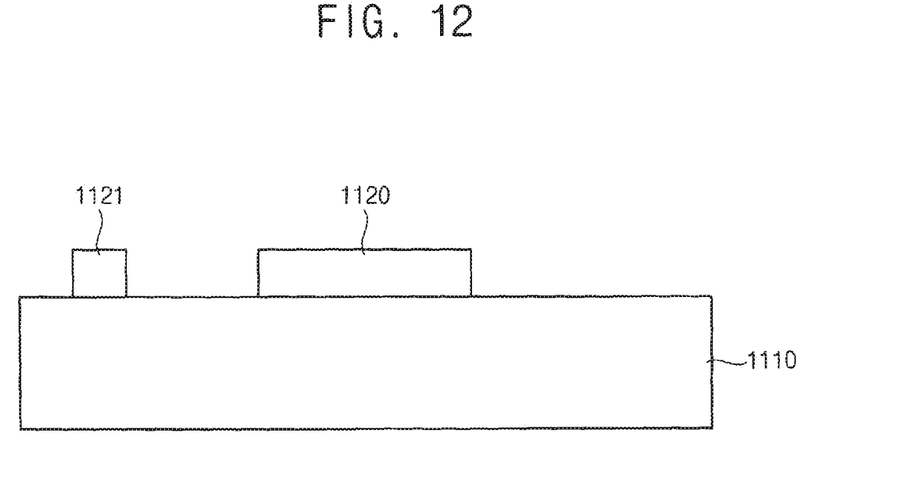

FIGS. 11 and 12 are cross-sectional views for describing a method of manufacturing a touch display apparatus according to an exemplary embodiment.

Referring to FIG. 11, a sensing electrode layer 1120a is formed on a base substrate 1110.

In an exemplary embodiment, the sensing electrode layer 1120a may include a transparent conductive material. For example, the sensing electrode layer 1120a may include indium tin oxide (ITO), indium zinc oxide (IZO), or the like. In another example, the sensing electrode layer 1120a may include titanium (Ti), molybdenum titanium (MoTi), or the like.

Referring to FIG. 12, a sensing electrode 1120 and a connection wiring 1121 are formed by patterning the sensing electrode layer 1120a.

The sensing electrode 1120 may include a transparent conductive material. For example, the sensing electrode 1120 may include indium tin oxide (ITO), indium zinc oxide (IZO), or the like. In another example, the sensing electrode 1120 may include titanium (Ti), molybdenum titanium (MoTi), or the like.

In an exemplary embodiment, the connection wiring 1121 may include the same material as that of the sensing electrode 1120. For example, the connection wiring 1121 may include a transparent conductive material, such as indium tin oxide (ITO), indium zinc oxide (IZO), or the like. In another example, the first connection wiring 1121 may include titanium (Ti), molybdenum titanium (MoTi), or the like.

In an exemplary embodiment, the first connection wiring 1121 may be disposed on the same layer as that on which the sensing electrode 1120 is disposed.

Referring to FIG. 6, a touch detector 1210 is formed. The touch detector 1210 is electrically connected to the first connection wiring 1121 and detects a touch event for the sensing electrode 1120.

Referring to FIG. 10, an insulation layer 1130 is formed on the base substrate 1110 on which the sensing electrode 1120 and the connection wiring 1121 are formed.

According to exemplary embodiments described above with reference to FIGS. 1, 2, 3, 4, and 5, a touch display apparatus may include a first connection wiring, a second connection wiring, a first touch detector and a second touch detector that are connected to a single sensing electrode. The second connection wiring and the second touch detector may be auxiliary elements and may operate only when at least one of the first connection wiring and the first touch detector has a defect. Accordingly, a malfunction of the touch display apparatus may be prevented, and the touch display apparatus may have relatively improved performance.

According to exemplary embodiments described above with reference to FIGS. 6, 7, 8, 9, 10, 11, and 12, a touch display apparatus includes a plurality of sensing electrodes and a plurality of connection wirings, and sensing electrodes disposed in the same column may be alternately connected to first connection wirings at a first side (e.g., a left side) with respect to the column and second connection wirings at a second side (e.g., a right side) with respect to the column, by a unit of at least one sensing electrode. Accordingly, the connection wirings may be arranged with a relatively low degree of integration, defects on the plurality of connection wirings may be prevented, and thus, the touch display apparatus may have improved performance.

The driving circuit 200 and/or one or more components thereof, may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like. In this manner, the features, functions, processes, etc., described herein may be implemented via software, hardware (e.g., general processor, digital signal processing (DSP) chip, an application specific integrated circuit (ASIC), field programmable gate arrays (FPGAs), etc.), firmware, or a combination thereof. As such, driving circuit 200 and/or one or more components thereof may include or otherwise be associated with one or more memories (not shown) including code (e.g., instructions) configured to cause the driving circuit 200 and/or one or more components thereof to perform one or more of the features, functions, processes, etc., described herein.

The memories may be any medium that participates in providing code to the one or more software, hardware, and/or firmware components for execution. Such memories may be implemented in any suitable form, including, but not limited to, non-volatile media, volatile media, and transmission media. Non-volatile media include, for example, optical or magnetic disks. Volatile media include dynamic memory. Transmission media include coaxial cables, copper wire, and fiber optics. Transmission media can also take the form of acoustic, optical, or electromagnetic waves. Common forms of computer-readable media include, for example, a floppy disk, a flexible disk, hard disk, magnetic tape, any other magnetic medium, a compact disk-read only memory (CD-ROM), a rewriteable compact disk (CDRW), a digital video disk (DVD), a rewriteable DVD (DVD-RW), any other optical medium, punch cards, paper tape, optical mark sheets, any other physical medium with patterns of holes or other optically recognizable indicia, a random-access memory (RAM), a programmable read only memory (PROM), and erasable programmable read only memory (EPROM), a FLASH-EPROM, any other memory chip or cartridge, a carrier wave, or any other medium from which information may be read by, for example, a controller/processor.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A touch display apparatus comprising:
   a base substrate;
   a sensing electrode on the base substrate;
   a first connection wiring electrically connected to the sensing electrode;
   a second connection wiring electrically connected to the sensing electrode;
   a first touch detector electrically connected to the first connection wiring and configured to detect a touch event for the sensing electrode; and
   a second touch detector electrically connected to the second connection wiring and configured to detect the touch event,
   wherein a touch signal for detecting the touch event is applied to only one of the first connection wiring and the second connection wiring,
   wherein the touch signal is applied to only the first connection wiring when both the first connection wiring and the first touch detector are free of a defect, and
   wherein the touch signal is applied to only the second connection wiring when at least one of the first connection wiring and the first touch detector has a defect.

2. The touch display apparatus of claim 1, wherein the first connection wiring and the second connection wiring are disposed on a same layer as the sensing electrode.

3. The touch display apparatus of claim 1, wherein the first connection wiring, the second connection wiring, and the sensing electrode comprise a same material.

4. The touch display apparatus of claim 1, wherein the second connection wiring and the second touch detector operate only when at least one of the first connection wiring and the first touch detector has the defect.

5. The touch display apparatus of claim 1, wherein the sensing electrode comprises a transparent conductive material.

6. The touch display apparatus of claim 1, further comprising:
   a processor configured to generate information associated with the touch event to control the first touch detector, the second touch detector, and the touch information generator.

7. The touch display apparatus of claim 1, further comprising an insulation layer on the sensing electrode.

8. The touch display apparatus of claim 7, wherein the insulation layer comprises silicon oxide ($SiO_x$) or silicon nitride ($SiN_x$).

* * * * *